United States Patent [19]

Yoshida et al.

[11] Patent Number: 4,645,293

[45] Date of Patent: Feb. 24, 1987

[54] OPTICAL WAVEGUIDE COUPLER HAVING A GRATING ELECTRODE

[76] Inventors: Taizo Yoshida, 1-13-5, Utsukushigaoka, Midori-ku, Yokohama-shi, Kanagawa-ken; Akihito Tanji, 16-10, Higashimaiko-machi, Tarumi-ku, Kobe-shi, Hyogo-ken; Masamitsu Masuda, 2-5-34, Kitasakurazuka, Toyonaka-shi, Ohsaka-fu; Jiro Koyama, D-40-104, 5-11, Tsukumodai, Suita-shi, Ohsaka-fu, all of Japan

[21] Appl. No.: 695,430

[22] Filed: Jan. 28, 1985

Related U.S. Application Data

[63] Continuation of Ser. No. 361,207, Mar. 24, 1982.

[30] Foreign Application Priority Data

Mar. 25, 1981 [JP] Japan ................... 56-42444
Mar. 25, 1981 [JP] Japan ................... 56-42445

[51] Int. Cl.$^4$ ............................................ G02B 6/10
[52] U.S. Cl. ............................................ 350/96.14
[58] Field of Search ................... 350/96.14; 250/227

[56] References Cited

U.S. PATENT DOCUMENTS

| | | | |
|---|---|---|---|
| 3,964,819 | 6/1976 | Auracher | 350/96.14 |
| 3,995,311 | 11/1976 | Taylor | 350/96.14 |
| 4,054,362 | 10/1977 | Bauer | 350/96.14 |
| 4,243,295 | 1/1981 | Alferness | 350/96.14 |
| 4,273,411 | 6/1981 | Alferness | 350/96.14 |
| 4,380,364 | 4/1983 | Marcatili | 350/96.14 |
| 4,381,139 | 4/1983 | Alferness | 350/96.14 |
| 4,390,236 | 6/1983 | Alferness | 350/96.14 |
| 4,448,479 | 5/1984 | Alferness | 350/96.14 |
| 4,461,535 | 7/1984 | Marcatili | 350/96.14 |

Primary Examiner—William L. Sikes
Assistant Examiner—Frank González

[57] ABSTRACT

An optical coupling device comprising an electrooptical substrate, a pair of optical waveguides formed in the surface of the substrate and a grating electrode is provided. The grating electrode is so disposed to extend along one of the pair of optical waveguides at least partially. Thus, when a suitable voltage is applied to the grating electrode, a periodically changing structure of refractive index is formed within the one of the paired optical waveguides to couple the paired optical waveguides, thereby allowing to transfer a light signal from one waveguide to the other.

16 Claims, 5 Drawing Figures

OPTICAL WAVEGUIDE COUPLER HAVING A GRATING ELECTRODE

This is a continuation of application Ser. No. 361,207 filed Mar. 24, 1982.

BACKGROUND OF THE INVENTION

1. Field of the Invention

The present invention relates to a photocoupling device which can be used in optical data communication, and in particular, to a photo-coupling device capable of accomplishing functions such as light wave switching and dividing, or branching by controlling the coupling condition between a pair of optical (light) wave guides.

In optical data communication, technologies are known for transmitting light waves in optical data media, and optical elements for processing light waves according to various purposes, such as branching, coupling, and filtering. While optical fiber is generally used for the longdistance light wave transmission, an optical film waveguide is used as a local light wave transmitting device. The optical film waveguide is designed such that a strip having a slightly larger refractive index is formed over the surface of a dielectric plate, and light waves are transmitted as enclosed therein. In this case, if a substrate of electro-optical crystal material is used as a dielectric plate, an optical element having various functions can be made, since the refractive index would vary according to changes of the applied voltage. The present invention relates to improvements of the photo-coupling device as one of the optical elements employing said electro-optical substrate.

2. Description of the Prior Art

FIG. 1 shows an example of the photo-coupling device employing a prior art electro-optical substrate. In this photo-coupling device, a pair of optical waveguides W1 and W2 are formed on the electro-optical substrate 1, and the coupling condition between the optical waveguides W1 and W2 is varied by changing the refractive indices of the optical waveguides by applying a voltage between plate electrodes 2 (2a, 2b) and 3 (3a, 3b) arranged above the optical waveguides, respectively. As evident from a graph shown in FIG. 2, coupling is intensified at a point where the effective refractive indices of both optical waveguides (shown by solid lines) become equal for a certain applied voltage Vo, thereby allowing to transfer the light wave of the center wavelength λo from one waveguide to the other. As the applied voltage is changed to V1, the effective refractive indices of said two optical wave guides become as shown by the broken lines, and the coupling for the light wave of center wavelength λ1 at the merging point of these two broken lines is enhanced, thereby causing the light wave to transfer from one optical waveguide to the other.

However, the prior art photo-coupling device shown in FIG. 1 is very poor in terms of wavelength selectivity with the coupling width being in the order of about 200 Å, and, consequently, it suffers from a disadvantage that the extent of waveform multiplexing is limited, particularly for the wavelength multiplexed optical communication. Another disadvantage is that when the impressed voltage is changed, the points at which the effective refractive indices of the two optical waveguides coincide are not continuous, and therefore transferring of the light wave by continuously changing the center wavelength (frequency) cannot be made.

SUMMARY OF THE INVENTION

The disadvantages of the prior art are overcome with the present invention which provides an improved photo-coupling device.

One of the advantages of the present invention is obtained by providing in parallel a pair of optical waveguides formed in an electro-optical substrate spaced apart from each other and each extending over a predetermined distance, and by arranging a grating electrode substantially above either one of the two optical waveguides along its longitudinal direction in a photo-coupling region formed by the parallel section of the two optical waveguides. The provision of such a grating electrode enables a periodic change of refractive index in one optical waveguide, thereby allowing to couple the two optical waveguides through optical interference. That is, when no voltage is applied to the grating electrode, the two optical waveguides spaced at a given distance remain uncoupled, and there is no light wave transfer. When a voltage is applied to the grating electrode, interference occurs, and two optical waveguides are strongly coupled, resulting in significant improvements in wavelength selectivity.

Another advantage of the present invention can be attained by providing a plate-like control electrode on the other optical waveguide in addition to the grating electrode, and further providing a plate-like auxiliary electrode on the side of the control electrode opposite from the grating electrode substantially parallel with said control electrode. Coupling of optical waveguides occurs with light of a specific wavelength when the cycle of the periodic structure of the grating electrode and the propagation constant of each of the optical waveguides satisfy the Bragg condition, and coupling sharply attenuates when the wavelength deviates from this specific wavelength. Such a coupling attenuation is particularly great when the wavelength selectivity is enhanced by the provision of a grating electrode. On the other hand, in accordance with the present invention, since the field intensity to be formed in one of the optical waveguides can be changed due to the provision of the control and auxiliary electrodes, the effective refractive index of this optical waveguide, or the propagation constant, can be varied optionally, thus facilitating phase matching between the two optical waveguides for a changed wavelength. For this reason, the two optical waveguides can be continuously coupled for an arbitrary center wavelength, thereby transferring the light wave from one to the other.

A still further advantage of the present invention can be obtained by providing a first optical waveguide of an electro-optical material formed on an electro-optical substrate, a second optical waveguide of a non-electro-optical material formed so as to define a photo-coupling region with said first optical waveguide, and an electrode capable of forming an electric field, which produces a periodic variation in the light travelling direction through said optical waveguide in said photo-coupling region. Since the electro-optical effect of the first optical waveguide markedly differs from that of the second optical waveguide, a difference in the refractive index between the first and second optical waveguides can be set at any desired value, and hence the wavelength selectivity can be improved greatly. Furthermore, since the effective refractive index of said first optical waveguide, or its propagation constant, can be arbitrarily changed by making it possible to apply a uniform electric field to said first optical waveguide an electro-optical effect, and further making its field intensity variable, phase matching between the two optical waveguides can be obtained easily regardless of wavelength changes. Accordingly, the two optical waveguides can be continuously coupled for any center wavelength to transfer the light wave from one to the other.

Accordingly, it is an object of the present invention to provide a photo-coupling device improved in wavelength selectivity (filter characteristics).

It is another object of the present invention to provide a photo-coupling device capable of positively coupling two optical waveguides for a light wave having an arbitrary wavelength.

It is a further object of the present invention to provide a photo-coupling device which is capable of producing a spatially clear-cut periodic change in refractive index by making the difference in refractive index between two optical waveguides great and causing a refractive index change to occur only in one of the two optical waveguides.

It is a still further object of the present invention to provide a photo-coupling device which is capable of switching and branching the light wave by controlling the coupling condition of a pair of optical waveguides.

It is a further object of the present invention to provide a photo-coupling device which can be used for optical data communication.

These and other objects of the present invention will become more apparent when reference is made to the following detailed description of the invention together with the accompanying drawings.

DESCRIPTION OF THE PREFERRED EMBODIMENTS

Figure 1:
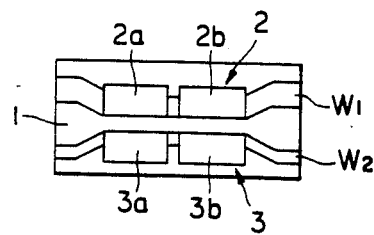
FIG. 1 is a plan view showing a photo-coupling device of the prior art.
Figure 2:
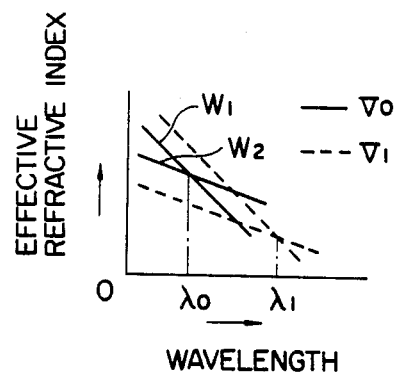
FIG. 2 is a graph showing characteristics of the photo-coupling device shown in FIG. 1.
Figure 3:
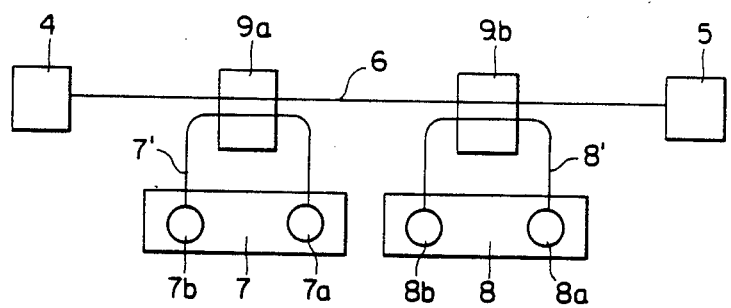
FIG. 3 is a diagram illustrating an example of the optical data communication system.

Referring to FIG. 3, in the optical data communication, light data is transmitted from a transmitting station 4 to a receiving station 5 via a main transmission line 6. In this case, it is required, for example, that light data transmitted via the main transmission line 6 be branched or divided out at a first repeating station 7 or a second repeating station 8, or that an additional light data be transmitted to the main transmission line 6. Accordingly, it is necessary to provide photo-coupling devices 9a and 9b for coupling the main transmission line 6 and branch lines 7' and 8' of the repeating sations. The photocoupling devices 9a and 9b are for controlling the coupling condition between the main transmission line 6 and the branch line 7', 8'. Through the coupling device 9a, 9b, it is possible, for example, that a light wave transmitted via the main transmission line 6 is transferred to the branch line 7' or 8', and the light wave thus transferred is fed to the receiver 7a or 8a of the repeating station, or that the light wave is transmitted to the main transmission line 6 from the receiver 7a or 8a of the repeating station 7 or 8 through the branch line 7' or 8'. For the wavelength multiplexed light communication, it is preferred to design individual photo-coupling device so as to receive and send light of specific wavelength. The photo-coupling device according to the present invention can be used as a photo-coupling device which is capable of controlling such a coupling condition.

Figure 4:
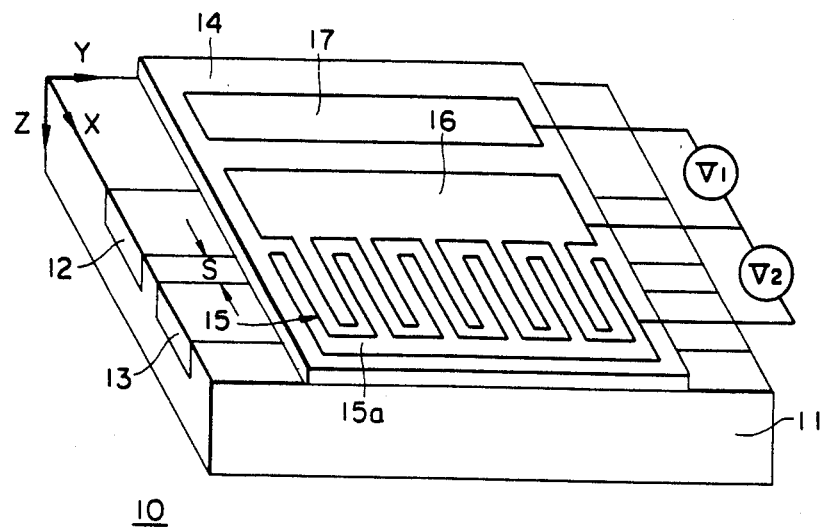
FIG. 4 is a perspective view showing an embodiment of the photo-coupling device of the present invention.

FIG. 4 shows an embodiment of the photocoupling device 10 of the present invention. There is formed a pair of asymmetrically shaped optical waveguides 12 and 13 in an electro-optical substrate 11 of the photo-coupling device 10. The electro-optical substrate is one which has the property to produce changes in refractive index according to the impressed voltage, i.e., so-called electro-optical effect. In this embodiment, $LiNbO_3$ substrate is used, however, for example, $LiTaO_3$ or $BaTiO_3$ substrate may be used. Preferably, the electro-optical effect can be obtained by arranging the Z-axis of the substrate 11 along the C-axis of the $LiNbO_3$.

The optical waveguides 12 and 13 are formed by diffusing Ti into the substrate 11. The optical waveguides 12 and 13 are formed asymmetrically by dimensioning them to differ in their cross-sectional size at least in the coupling region by for example forming them to have differing widths, and a spacing S is provided properly therebetween so as to enhance the wavelength selectivity, and that when no voltage is applied to the grating electrode, the optical waveguides 12 and 13 are virtually not coupled. The optical waveguide is generally sized to have a width of 2 to 10 μm, a depth of 1 to 5 μm, and a spacing S of approximately 1 to 2 μm. The optical waveguides 12 and 13 extend parallel over a predetermined length (at least over a required coupling length) with a spacing S therebetween, defining a photo-coupling region. A buffer layer 14 is formed by deposition on the substrate 11, and thereon are formed by deposition a grating electrode 15, a control electrode 16, and an auxiliary electrode 17. It is preferred that the buffer layer 14 is formed by an insulating material, typically $SiO_2$, and that each electrode is formed by vapor-depositing a conductive material such as Al and Au. The grating electrode 15 comprises a plurality of bar-like electrodes which are arranged in a railroad tie-like fashion along the optical waveguide 13, and odd numbered electrodes from an end are mutually connected at one side and to form an integral comb-like electrode 15a, while evennumbered electrodes are connected to the control electrode, forming also an integral structure. A voltage V2 can be applied between the comb-like electrode 15a and the control electrode 16, causing periodic refractive index changes in the optical waveguide 13, thereby coupling the optical waveguides 12 and 13. In this case, although the two optical waveguides can be coupled by forming a periodic structure of refractive index at least along a part of the optical waveguide 13, it is preferable to form a periodic structure of refractive index in the spacing between the two optical waveguides as well as in the optical waveguide 13 in order to attain an excellent coupling. More particularly, it is preferable that the side at which the control electrode 16 is connected with the bar-like electrode is arranged so as to be approximately aligned with the side of the optical waveguide 12, and that the front end of the bar-like electrode comprising the comb-like electrode 15a is brought as close to the side of the control electrode 16 as possible.

The plate-like auxiliary electrode 17 is provided in parallel with the plate control electrode 16. A voltage V1 can be applied between the auxiliary electrode 17 and the control electrode 16. Electric field intensity in the optical waveguide 12 is changed by changing the voltage V1, and the effective refractive index of the optical waveguide 12, i.e., propagation constant, is adjusted to a proper value. It is not always necessary to arrange the auxiliary electrode 17 and the control electrode 16 on the same plane in parallel. For example, when the substrate 11 is sufficiently thin, the auxiliary electrode 17 may be provided on the bottom side of the substrate 11 as a counter or opposite electrode. However, to minimize the interference between the auxiliary electrode 17 and the grating electrode 15, the auxiliary electrode 17 should be sufficiently spaced apart from the grating electrode 15.

Now, the operation of the photo-coupling device configured as mentioned above will be described. Suppose that the propagation constants of the optical waveguides 12 and 13, and the electrode pitch of the grating electrode 15 are represented by $\beta_1$, $\beta_2$ and $\Lambda$, respectively. When no voltage V2 is applied to the grating electrode 15, no coupling takes place between the two optical waveguides, and each waveguide functions as an independent optical waveguide. On the other hand, when a voltage V2 is applied to the grating electrode 15, and Bragg condition $|\beta_1-\beta_2|=2\pi/\Lambda$ satisfied with respect to light having a center wavelength $\lambda_o$, phase-match is obtained, and the two optical waveguides are coupled strongly, thereby transferring the light from one to the other. That is, periodical refractive index changes occur between the optical waveguides and in the waveguide 13 due to the electro-optical effect, thereby higher harmonics are generated and interference occurs between the two optical waveguides.

Since propagation constants $\beta_1$, $\beta_2$ vary when the wavelength of the light varies, coupling between the two optical waveguides depends on the wavelength. Accordingly, the coupling condition is no longer satisfied when the central wavelength of the incident light has changed to $\lambda=\lambda_o+\Delta\lambda$. According to the present invention, however, the two optical waveguides can be coupled by changing the effective refractive index of the optical waveguide 12, i.e., only propagation constant $\beta_1$, by changing the voltage V1 between the auxiliary electrode 17 and control electrode 16 so as to satisfy the Bragg condition again. Accordingly, the center wavelength can be continuously adjusted to any value by changing the voltage V1, and coupling occurrence and intensity can be controlled by changing the voltage V2. It was found from an example of the calculation in the present invention that the band width becomes about 1/7 for almost equal coupling length as compared with the prior art embodiment. This implies that the wavelength selectivity of the present invention is excellent, and the wavelength band width can be narrowed to below 50 Å.

Figure 5:
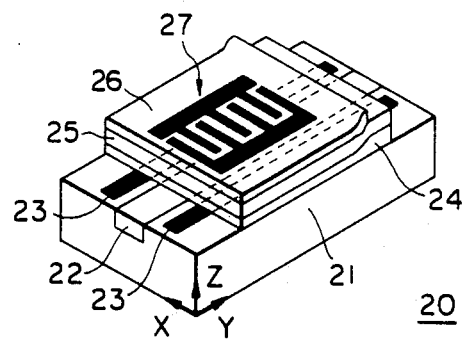
FIG. 5 is a perspective view showing another embodiment of the photo-coupling device of the present invention.

Now, another embodiment of photo-coupling device 20 of the present invention will be described with reference to FIG. 5. The photo-coupling device 20 has a channel type optical waveguide 22 formed in the surface of its electro-optical substrate 21. The electro-optical substrate is one made of electro-optical crystal, such as $LiNbO_3$, $LiTaO_3$ and $BaTiO_3$, as mentioned previously. It is preferred to align the Z-axis of the substrate 21 with the C-axis of the electro-optical crystal. The optical waveguide 22 is formed by diffusing Ti. On both sides of the optical waveguide 22 is provided a pair of auxiliary electrodes 23. A uniform electric field can be formed in the optical waveguide 22 by applying a voltage between these electrodes. Accordingly, by changing the voltage between the auxiliary electrodes 23, the propagation constant of the optical waveguide can be adjusted. The auxiliary electrodes 23 are typically formed by vacuum evaporation with such a conductive material as Au and Al.

A $SiO_2$ buffer layer 24 is formed on the substrate 21, and thereon is overlaid a slab-like optical waveguide 25. The optical waveguide 22 has a refractive index different from that of the optical waveguide 22, and is made of non-electro-optical material which exhibits virtually no-electro-optical effect as compared with the optical waveguide 22. Such a non-electro-optical material includes $Nb_2O_5$, typically. The optical waveguide 25 is arranged in parallel with the other optical wavequide 22, and is kept at a specified distance from the latter over a specified distance via the buffer layer 24. The photocoupling region is defined at the part where the two optical waveguides are provided in parallel. The optical waveguide 25 may be formed to a desired thickness by any known film forming technique.

On the slab type optical waveguide 25 is deposited a $SiO_2$ buffer layer 26, and a grating electrode 27 is also formed thereon. In the embodiment shown in FIG. 5, the grating electrode 27 is formed by arranging a pair of comb-like electrodes so as to face each other with the branches thereof enmeshed mutually. That is, by applying a voltage between the pair of comb-like electrodes, periodic changes in refractive index can be produced in the photo-coupling region, particulary in the optical waveguide 22. In this case, by making the branch of the comb-like electrode sufficiently long as compared with the width of the optical waveguide 22, the electro-optical effect grating which changes periodically almost solely in the longitudinal direction of the optical waveguide 22 can be produced in the optical waveguide 22. This implies that the grating which causes interference becomes clear-cut, thereby clarifying its period and improving the wavelength selectivity of the photocoupling device. Even if a comb-like electrode is used, field extension due to the edge effect at the branch end can be set outside the photo-coupling region, and hence adverse effects due to the edge effect can be avoided. The electrode 27 may take forms other than the comb-like shape of this embodiment.

Now, the operation of the photo-coupling device of the present invention will be described with the propagation constants of the optical waveguides 22 and 25, and the period (cycle) of electro-optical effect grating designated as $\beta_1$, $\beta_2$ and $\Lambda$, respectively. When no voltage is applied to the electrode 27, no coupling takes place between the two optical waveguides, and each functions as an independent optical waveguide. When a voltage is applied to the electrode 27, and the Bragg condition $|\beta_1-\beta_2=2\pi/\Lambda$ is satisifed, phase match is obtained, and the two optical waveguides are coupled strongly, thereby allowing to transfer the light from one to the other.

On the other hand, when the center wavelength of the incident light changes to $\lambda=\lambda_o+\Delta\lambda$, the Bragg condition is no longer satisfied, and light transfer ceases. In the present invention, however, the Bragg condition with respect to the center wavelength can be satisfied again by changing the effective refractive index of the optical waveguide 22, i.e., propagation constant $\beta_1$ only, through the application of a voltage between a pair of auxiliary electrodes 23, thereby making possible the coupling of the two optical waveguides.

While the above provides a full and complete disclosure of the preferred embodiments of the present invention, various modifications, alternate constructions, and equivalents may be employed without departing from the true spirit and the scope of the invention. Therefore, the above description and illustration should not be construed as limiting the scope of the invention, which is defined by the appended claims.

What is claimed is:

1. A photo-coupling device comprising:
   an electro-optical substrate;
   a first optical waveguide formed in a major surface of said substrate;
   first electrode means formed on said major surface spaced apart from and in parallel with said first optical waveguide for applying a uniform electric field to said first optical waveguide when a first voltage is applied;
   a first buffer layer formed on said major surface over said first optical waveguide and said first electrode means;
   a slab of non-electro-optical material formed on said first buffer layer, capable of being optically coupled to said first optical waveguide, and serving as a second optical waveguide;
   a second buffer layer formed on said slab; and
   second electrode means formed on said second buffer layer for applying a periodically changing electric field to said first optical waveguide when a second voltage is applied.

2. The device of claim 1 wherein said electro-optical substrate is comprised of a material selected from the group consisting of $LiNbO_3$, $LiTaO_3$ and $BaTiO_3$.

3. The device of claim 2 wherein said non-electro-optical material is $Nb_2O_5$.

4. The device of claim 1 wherein said first and second buffer layers are comprised of an electrically insulating material.

5. The device of claim 4 wherein said electrically insulating material is $SiO_2$.

6. The device of claim 1 wherein said first electrode means includes a pair of strip-shaped electrodes formed on said major surface, one on each side of said first optical waveguide.

7. The device of claim 6 wherein said second electrode means includes a pair of comb-shaped electrode sections which are arranged with their fingers interleaved.

8. A photo-coupling device comprising:
   an electro-optical substrate having a major surface which is normal to a crystallographic axis of said substrate;
   a pair of first and second optical waveguides formed in said major surface of said substrate over a predetermined coupling region, said pair of optical waveguides having differing propagation constants to prevent them from being optically coupled unintentionally;
   a buffer layer formed on said major surface;
   a first electrode formed on said buffer layer in said coupling region, said first electrode including a plurality of first bar-like portions, spaced apart at a predetermined interval along said first optical waveguide and each extending across said first optical waveguide, and a first elongated portion, located at the side of said first optical waveguide opposite to the side where said second optical waveguide is disposed and commonly connected to said plurality of first bar-like portions;
   a second electrode formed on said buffer layer in said coupling region, said second electrode including a second elongated portion, having a width substantially as wide as said second optical waveguide and lying in parallel with said second optical waveguide, and a plurality of second bar-like portions, each of which extends from said second elongated portion across the gap between said first and second optical waveguides and also across said first optical waveguide as interposed between the two corresponding adjacent first bar-like portions;
   a third electrode formed on said buffer layer spaced apart from and in parallel with said second electrode on a side opposite from said first electrode; and
   means for applying a first voltage between said first and second electrodes and a second voltage between said second and third electrodes.

9. The device of claim 8 wherein said buffer layer comprises an electrically insulating material.

10. The device of claim 9 wherein said electrically insulating material is $SiO_2$.

11. The device of claim 8 wherein said first and second optical waveguides are asymmetrically shaped at least in said coupling region.

12. The device of claim 11 wherein said first and second optical waveguides differ in their cross-sectional size at least in said coupling region.

13. The device of claim 12 wherein said first and second optical waveguides differ at least in width at least within said coupling region.

14. The device of claim 13 wherein said first and second optical waveguides extend in parallel with a predetermined gap therebetween in said coupling region.

15. The device of claim 8 wherein said substrate comprises a material selected from the group consisting of $LiNbO_3$, $LiTaO_3$ and $BaTiO_3$.

16. The device of claim 8 wherein said first and second electrodes are comb-shaped and are arranged with their bar-like portions interleaved.

* * * * *